Nov. 15, 1932.   J. E. PADGETT ET AL   1,887,943
TRANSMISSION GEARING
Filed June 25, 1931   4 Sheets-Sheet 1
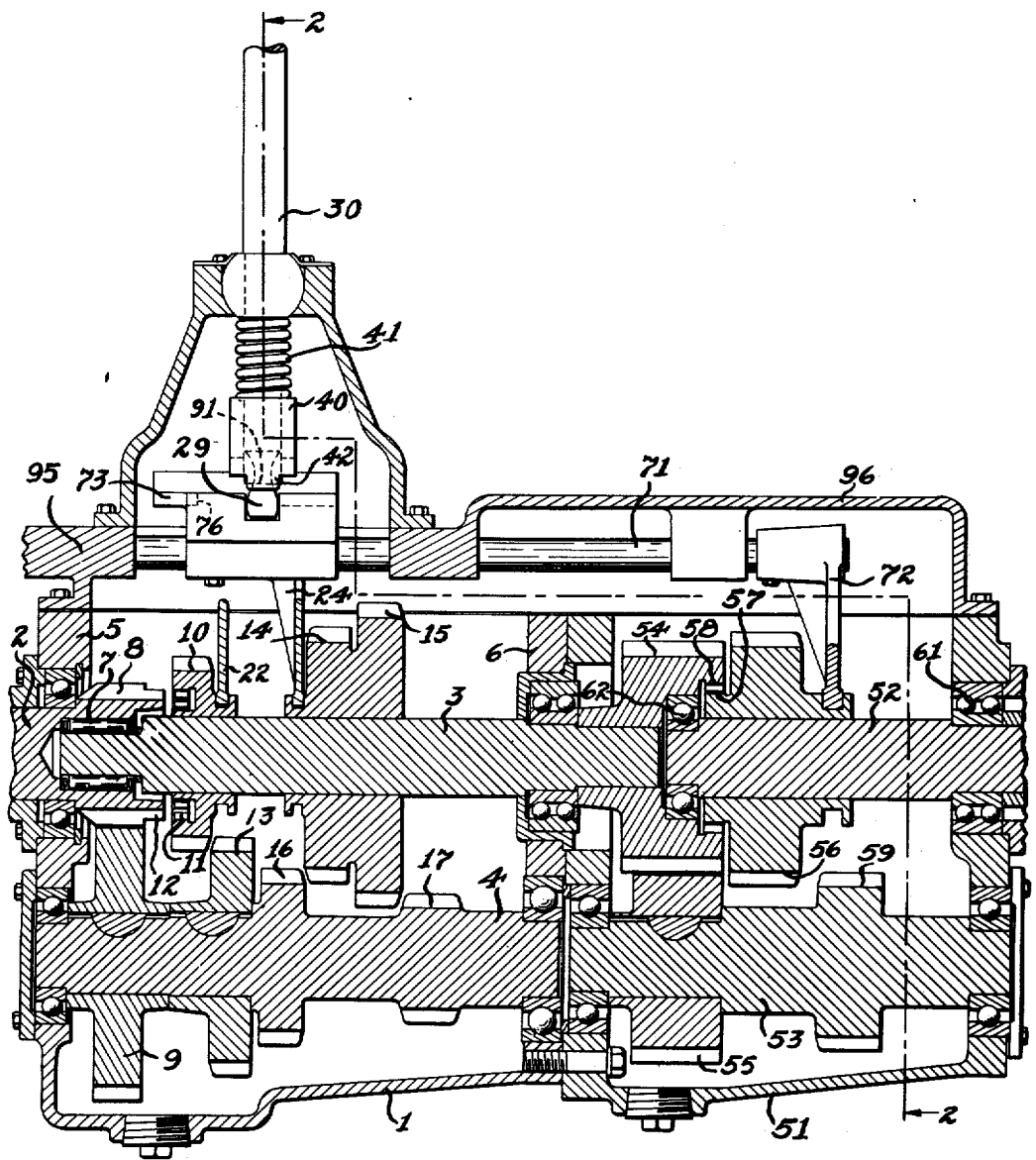
Fig-1-
Joseph E. Padgett
& Carl D. Peterson,
INVENTORS
BY Bodell & Thompson
ATTORNEYS.

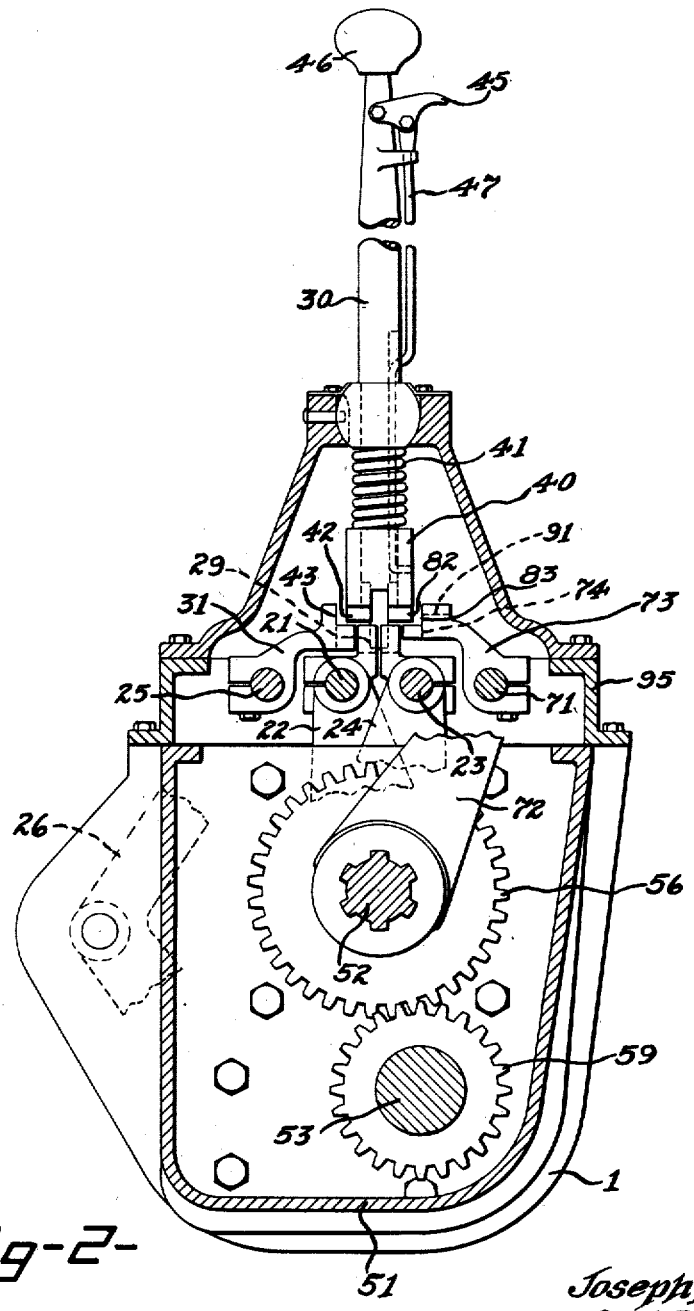

Nov. 15, 1932.  J. E. PADGETT ET AL  1,887,943
TRANSMISSION GEARING
Filed June 25, 1931   4 Sheets-Sheet 3
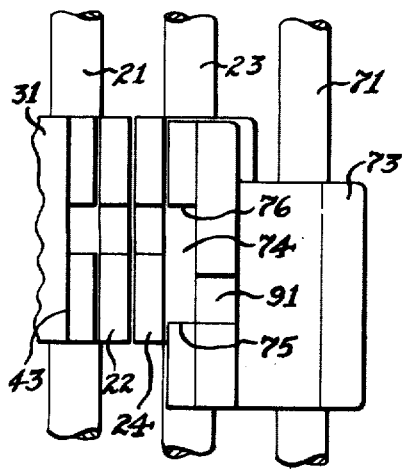
Fig 6
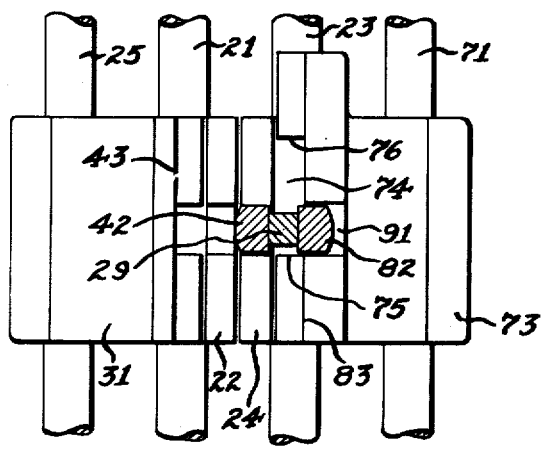
Fig-5-
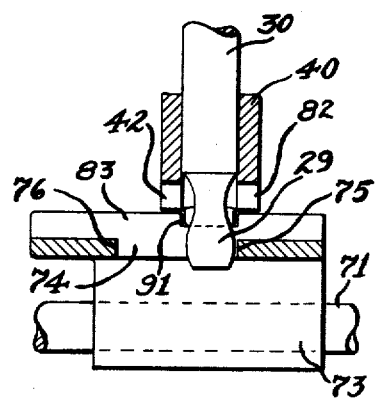
Fig-4-
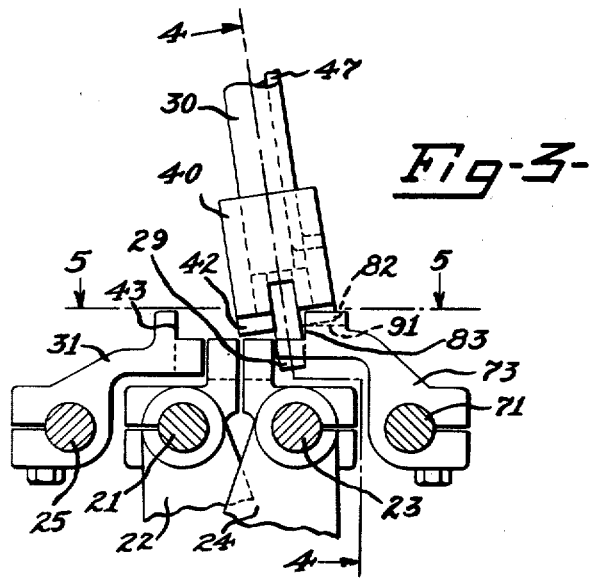
Fig-3-
Joseph E. Padgett
& Carl D. Peterson,
INVENTORS
BY Bodell & Thompson
ATTORNEYS.

Nov. 15, 1932.   J. E. PADGETT ET AL   1,887,943
TRANSMISSION GEARING
Filed June 25, 1931   4 Sheets-Sheet 4
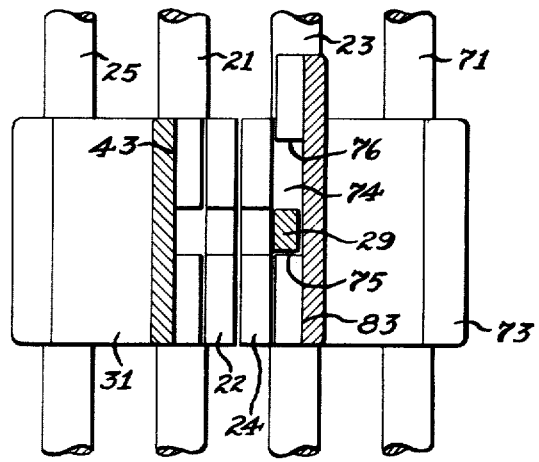
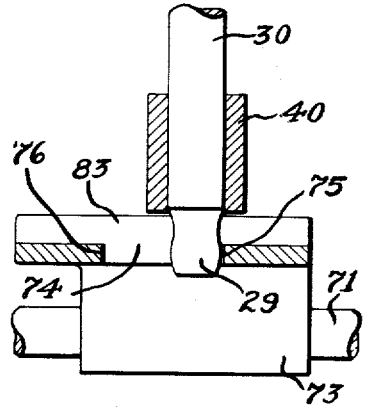
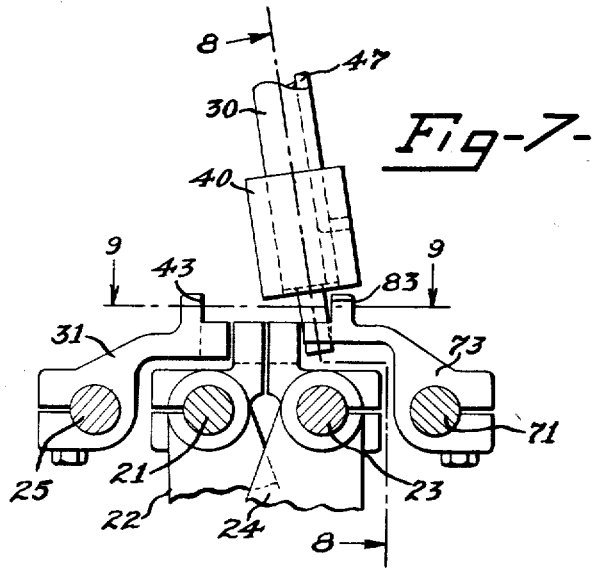
Joseph E. Padgett
& Carl D. Peterson,
INVENTORS
BY Bodell & Thompson
ATTORNEYS.

Patented Nov. 15, 1932

1,887,943

UNITED STATES PATENT OFFICE

JOSEPH E. PADGETT AND CARL D. PETERSON, OF TOLEDO, OHIO, ASSIGNORS TO SPICER MANUFACTURING CORPORATION, OF TOLEDO, OHIO, A CORPORATION OF VIRGINIA

TRANSMISSION GEARING

Application filed June 25, 1931. Serial No. 546,726.

This invention relates to change speed transmission gearing, such as are used in motor vehicles, and has for its object, a particularly simple and efficient construction by which a plurality of gear changes can be added to a standard gear set, and the added speed changes effected by the selecting and gear shifting lever of the standard gear set.

It further has for its object, a construction by which the added plural number of gear changes, or the added gear set is applied to a standard gear box. That is, the gear box for a standard gear set.

It further has for its object, a construction by which the gears or shiftable elements of the added gear set can be shifted by the gear shifting lever of the standard or main gear set and left in shifted position, and the gear shifting lever returned to neutral position where any of the gear shifts can be made in the standard gear set, so that the motion is transmitted through gears of the standard gear set, and gears of the auxiliary or added gear set.

Other objects will appear throughout the specification.

The invention consists in the novel features and in the combination and constructions hereinafter set forth and claimed.

In describing this invention, reference is had to the accompanying drawings in which like characters designate corresponding parts in all the views.

Figure 1 is a longitudinal sectional view of a gearing embodying this invention.

Figure 2 is a sectional view on line 2—2, Figure 1.

Figure 3 is a fragmentary transverse sectional view through the gear shifting mechanism showing the gear shifting lever moved into engagement with the additional gear shifting rod which operates the gears of the added or auxiliary gear set.

Figures 4 and 5 are sectional views taken respectively on lines 4—4 and 5—5, Figure 3.

Figure 6 is a view, similar to Figure 5, showing the additional shifter rod in its shifted position, or shifted out of its normal position.

Figures 7, 8 and 9 are views similar to Figures 3, 4 and 5 of a slightly modified form of the invention, Figures 8 and 9 being taken respectively on line 8—8 and line 9—9, Figure 7.

This transmission gearing comprises generally, a main gear set, and an auxiliary gear set, and gear shifting means including the usual shift rods, and a selecting and gear shifting lever for making the usual gear shifts in the main gear set, and an additional shift rod for making the gear changes in the auxiliary set, the additional rod being operated by the gear shifting lever, but being capable of being shifted by the gear shifting lever and to remain in its shifted position and permit the gear shifting lever to return to neutral where any of the changes in the main gear set can be effected, so that in addition to direct drive and all the gear changes effected in the main gear set, additional speeds can be provided through the auxiliary set acting in conjunction with any of the speed changes in the main gear set.

Thus, in standard gear sets, for effecting say four speeds forward and reverse, an additional speed forward can be effected through the auxiliary gear set with each of the forward speeds of the gear box, and also an additional reverse speed can be effected through the gear box in conjunction with the reverse speed in the main gear set. Or again, with a gear set having four speeds forward and reverse, four additional speed changes forward can be effected through the auxiliary gear set, and one additional reverse gear, or an eight speed forward transmission with two reverse gears is produced. Furthermore, all of the different gear changes are effected with one gear shifting lever, and the additional speeds are provided by adding the auxiliary gear set in a housing applied to the standard gear set.

1 designates the gear box of the standard gear set; 2 the drive shaft; 3 the transmission shaft; and 4 the counter-shaft; these being mounted in suitable bearings in the front and rear walls 5 and 6 of the gear box 1, the front end of the transmission shaft 3 being mounted in the usual pilot bearing 7 in the rear end of the drive shaft 2.

8 and 9 are the usual intermeshing gears on the drive shaft 2 and the counter-shaft 4 for transmitting the motion of the drive shaft 2 to the counter-shaft 4. The shaft 2 and gear 8 are usually called a stem gear.

10 is a sliding gear on the transmission shaft, this having the usual clutch gear 11 for coacting with a complemental clutch gear 12 in the end of the gear 8. The gear 10 is shiftable forwardly, Figure 1, from neutral to engage the clutch gears and rearwardly from neutral to slide the gear 10 into mesh with a gear 13 on the counter-shaft to produce third speed.

14 and 15 is a double gear slidable on the transmission shaft 3, it being slidable forwardly from neutral to mesh the gear 14 with the gear 16 on the counter-shaft to produce second speed, and rearwardly from neutral to mesh the gear 15 with the gear 17 on the counter-shaft to produce first speed. Reverse gear is obtained by shifting a double intermediary or idler, not shown, into position to mesh with the gears 17 and 15 when the gear 15 is in neutral position.

In the standard transmission gearing, the transmission shaft 3 is connected through a universal joint to the propeller shaft of the vehicle. The gears are shifted by means of usual shifter rods and forks operated by a selecting and gear shifting lever.

21 designates the shift rod having a fork 22 connected to the gear 10. 23 designates a shift rod having a fork 24 connected to the double gear 14, 15. 25 designates the shift rod having a fork 26 connected to the double idler gear which produces reverse speed.

The shift rods and selecting and shifting lever are mounted in the usual manner in the cover of the gear box. The forks 22 and 24 are provided with the usual notches therein for coacting with the finger 29 of the selecting and shifting lever 30. The shifter rod 25 is provided with a block 31 having a notch for coacting with the finger 29 of the gear shifting lever. The notches of the forks and the blocks are arranged in alinement when all of the shift rods are in neutral position so that the gear shifting lever can be operated to select any one of the rods. Also, a latch is provided on the gear shifting lever for preventing unintentional shifting of the gear shifting lever into engagement with the block 31 of the gear shifting rod 25, this latch being here shown as a tubular member 40 slidable on the gear shifting lever 30 and normally pressed downwardly by a spring 41, the latch having a shoulder 42 at its lower end which coacts with a barrier or shoulder 43 on the block 31.

The shoulder 42 therefore, will normally engage the shoulder 43 if the gear shifting lever is moved laterally in the proper direction and thus prevent the finger 29 of the gear shifting lever 30 from entering the notch of the block 31 unless the latch 40 is intentionally displaced. The latch is operated in order to move the shoulder 42 upwardly, so that it will clear the flange 43 and permit the finger 29 of the gear shifting lever to enter the notch of the block 31, by means of a finger lever 45 pivoted to the upper end of the gear shifting lever 30 near the handle 46 thereof and connected by a link 47 to the latch 40. Thus, when the driver desires to shift into reverse gear, he must first pull upwardly on the finger lever 45. The construction thus far described per se, forms no part of this invention, but is standard construction. The term shift rod is used for convenience, as it is the ordinary term applied to the members for shifting the shiftable elements of a transmission gearing. However, any other form of shifter member may be used.

As before stated, the additional gear set is preferably added to a standard gear set and comprises a housing 51 mountable on the rear wall 6 of the gear box 1, a shaft 52 mounted in the housing 51 in line with the transmission shaft 3, a counter-shaft 53 mounted in the housing, intermeshing gears 54 and 55 mounted respectively on the rear end of the transmission shaft 3 in the housing 51 and on the counter-shaft 53, and a sliding gear 56 on the shaft 52 and having a clutch gear 57 normally interlocked with the clutch gear 58 on the gear 54, the gear 56 being shiftable to disengage the clutch gears and mesh the gear 56 with the gear 59 on the counter-shaft 53. The shaft 52 is mounted at its rear end in a bearing 61 in the rear wall of the housing 51 and at its front end in a pilot bearing 62 in the gear 54. The counter-shaft 53 is mounted in suitable bearings in the front and rear wall of the housing 51. The counter-shaft 53 is, in the illustrated embodiment of the invention, mounted in line with the counter-shaft 4.

As before stated, normally the gear 56 is in the position shown in Figure 1, wherein the clutch gears 57 and 58 are engaged, and when in such position, the various speeds are controlled by the gear changes in the main gear box 1 in the usual manner. When however, gear changes in addition to those effected through the gears in the main gear box are desired, the gear 56 is shifted into mesh with the gear 59 and hence, any of the gear changes effected in the main gear box are modified through the gears 56 and 59 so that in addition to the regular or standard four speeds forward and reverse speed, four additional forward speeds and an additional reverse can be effected.

In Figures 7, 8, and 9, the locking member or sleeve 30 is shown as unprovided with a shoulder 82 and the barrier 83 unprovided with a notch for receiving the shoulder, and in the construction shown in these figures, when the auxiliary rod 71 is to be shifted, the sleeve 40 is elevated so that its lower end can pass up over the barrier 83 while the shifting force is applied by the finger 29 of the lever 30 engaging one or the other of the end walls 75, 76 of the slot 74.

The gear 56 is shifted by means of an additional shifter rod 71 extending parallel to the shift rod 23, and a fork 72 connecting the rod and the gear 56. The rod 71 has a block 73 thereon provided with an elongated recess 74 for receiving the finger 29 of the gear shifting lever 30, this recess being preferably of a length substantially equal to the throw or travel of the rod 71 plus one half the width of the finger 29, one end portion, as the rear end portion of the recess being in neutral position, or in line with the notch of the forks 26, 27, and the block 31 when they are in neutral position and the other end portion being movable into alinement with said slots when the rod 71 is shifted out of its normal position Figure 1, to engage the gears 56, 59. During rearward shifting of the rod 71 to shift the gear 56 from the position shown in Figure 1 to carry the gear 56 into mesh with the gear 59, the finger 29 of the gear shifting lever may thrust against the rear end wall 75 of the recess, and the shifting movement carries the front end wall 76 of the recess into neutral position. The recess permits the gear shifting lever to be shifted back to neutral leaving the rod 71 in its shifted position, or its position occupied when the gear 56 is in mesh with the gear 58, and when the gear shifting lever 30 is back in neutral position it can be selected to shift any one of the rods 25, 21 and 23.

When it is desired to use, in transmitting the power, only the gears in the main gear box, that is, to use the standard gear shift, the gear shifting lever is shifted back to neutral, thus shifting any shifted gears in the main box 1 to neutral position and the gear shifting lever shifted to select the rod 71 and then shifted to shift the rod 71 forwardly. The forward shifting of the rod 71 reengages the clutch faces 57 and 58, or connects the transmission shaft 3 and shaft 52 of the auxiliary gearing in direct drive relation. The gear shifting lever is then shifted back to neutral this being permitted by means of the recess 74 and any one of the shift rods 25, 21 and 23 selected and shifted. The finger 29 and the recess 74 provide a lost motion connection between the gear shifting lever and the shift rod 71.

In order to prevent unintentional engagement of the finger 29 and the rod 71, the latch member 40 is provided with a shoulder 82 corresponding to the shoulder 42 of the latch, and this shoulder 82 coacts with a flange or barrier 83 corresponding to the flange or barrier 43 of the block 31, so that the finger lever 45 must be pulled up whenever the block 73 of the rod 71 is to be engaged by the gear shifting lever.

The shoulder 82 is however utilized to couple the shifting lever 30 to the rod 71 to shift the rod 71. Although the recess may be the proper length to permit the finger 29 of the shifting lever to thrust against the end wall thereof, it may be of greater length and provide only a lost motion between the shifter rod and the lever and the shoulder 82 relied on to shift the rod 71. In order that the shoulder may shift the rod, the block 73 is provided with a notch 91 on the upper edge of the barrier 83. The notch is alined normally with the notches of the forks 26, 27 and block 31 when the shift rods 21, 23, 25 are in neutral.

When the latch 40 is pulled upwardly by means of the finger lever 45 to clear the barrier 83 and let the finger 29 of the shift lever 30 enter the lost motion recess 74, and the lever 30 shifted farther the shoulder 82 enters and interlocks in the notch 91. During shifting movement of the lever 30, the rod 71 will be shifted by reason of the interlocking engagement of the shoulder 82 and notch 91. The thrust of the finger 29 against the end wall of the recess 74 may assist in the shifting operation, but in the event the recess 74 is longer than the throw of the rod and is not accurately located, the shoulder 82 and notch 91 is relied on and the recess 74 performing the function of stopping the finger 29 when returned to neutral after shifting the rod 71.

After the rod 71 has been shifted, the latch 40, or its shoulder tooth 82 is disengaged from the notch 91, by moving the finger lever 45 farther upward sufficient to lift the shoulder 82 out of the notch 91 so that the lever 30 is released therefrom and it can be returned to neutral to reengage the rod 71. When it is in its shifted position the finger lever 45 must be lifted to its full extent to permit the shoulder 82 to drop in the notch 91.

The auxiliary gear set is applied to a standard gear box by mounting the auxiliary housing 51 on the rear wall of the gear box 1 and mounting the gear 54 on the rear end of the transmission shaft 3, and providing the usual cover 95 for the box 1 with an extension 96 over the housing 51, and mounting the additional rod 71 in the cover. Hence, the additional speeds can be added to a standard transmission economically compared with building an entirely new additional speed transmission, and this is so even though in some instances the transmission shafts 3, or counter-shafts 4, might have to be modified, or other transmission shafts and counter-shafts furnished when the auxiliary gearing is added.

In operation, the gear 56 is normally in the position shown in Figure 1 wherein the shaft 52 is coupled in direct drive relation to the transmission shaft 3, so that the vehicle may be driven through any of the speed changes in the main gear set in the gear box 1 in the usual manner. When additional speeds are desired, one of which may be an over-drive, or under-drive, the shift rod 71 is shifted by means of the same gear shifting lever used to shift the gears of the main gear set, to carry the gear 56 into mesh with the gear 59, the shifting lever 30 being first shifted to neutral before shifting the rod 71. Thus, when the gear 10 is in mesh with the gear 13, the motion is transmitted from the drive shaft 2 as follows. Gears 8 and 9, 13 and 10; transmission shaft 3; gears 54 and 55; counter-shaft 53, and from gear 59, to gear 56, to the shaft 52 of the auxiliary gearing, which is connected to the propeller shaft of the motor vehicle. When the gear 14 is shifted to mesh with the gear 16, the drive is through gears 8, 9, 16, 14; transmission shaft gears 59 and 56, to the shaft 52 of the auxiliary gearing. When the gear 15 is shifted into mesh with the gear 17, the drive is through the gears 8, 9, 17, 15; transmission 3; gears 54 and 55; counter-shaft 53; and shaft 3; gears 54, 55; counter-shaft 53; gears 59 and 56, to the auxiliary shaft 52. When the gear 10 is shifted to engage the high speed clutch consisting of the gear clutches 11, 12, the motion is transmitted through transmission shaft 3, gears 54, 55, counter-shaft 53, and gears 59, 56, to the shaft 52. When the intermediary is shifted to mesh with both gears 17 and 15, there is an additional reverse speed through the gears 8, 9, 17; the intermediary, 15; transmission shaft 3; gears 54, 55; counter-shaft 53; gears 59, 56; to the auxiliary shaft 52.

The gear 56 has no neutral position and when not shifted in mesh the gear 58 is coupled in direct drive relation with the gear 54, or transmission shaft 3 and hence, when in its normal position, the gears of the main gear set in the gear box 1 operate in the usual manner, and when the gear 10 is shifted to engage the clutch faces 11 and 12, direct drive, or fourth speed is effected, and when the gear 10 is shifted from neutral to engage it with the gear 13, or when the gears 14 and 15 are shifted, the speed of the vehicle is controlled solely in the ordinary manner by the gears in the main gear set.

This invention is particularly advantageous in that it results in the economical manufacture of various types of change speed gearings, as the additional gears are applied to a standard gear set or unit.

What we claim is:

1. In a transmission gearing, the combination of a main gear set including shiftable gear elements, and an auxiliary gear set including shiftable gear elements, a single selecting and shifting lever normally located in neutral position, and a plurality of shift rods operated by the lever, one of said shift rods being connected to a shiftable element of the auxiliary gear set and said lever and said shift rod having coacting means permitting uncoupling of the lever from the shift rod and the return of the lever to neutral position independently of said shift rod.

2. In a transmission gearing, the combination of a main gear set, and an auxiliary gear set, a set of shift rods selectively operable to effect different gear shifting operations in the main gear set, and an additional rod for effecting gear changes in the auxiliary gear set, a selecting and gear shifting lever having a neutral position and having means for selecting and shifting any one of the set of rods successively with the shifting of the additional rod to effect a gear change in the auxiliary set, said lever and the additional rod having coacting means by which the lever is shiftable to neutral positon independently of the additional rod leaving the additional rod in shifted position.

3. In a transmission gearing, the combination of a set of shifter rods operable to effect different gear changes, an additional shifter rod operable to effect an additional gear change in conjunction with any of the former gear changes, and a selecting and gear shifting lever coacting with said rods, and movable from neutral into selective engagement with any one of the rods, said lever and the additional shift rod having means for shifting the additional rod in one direction from neutral and returning to neutral position independently of the additional shift rod leaving the additional shift rod in its operated position.

4. In a transmission gearing, the combination of a set of shifter rods operable to effect different gear changes, an additional shifter rod operable to effect an additional gear change in conjunction with any of the former gear changes, and a selecting and gear shifting lever coacting with said rods and movable from neutral into selective engagement with any one of the rods, a lost motion connection between the lever and the additional rod equal to the throw of the lever plus one half the thickness of part of the lever coacting with the rod with one of either end of said connection in neutral position, whereby the lever is returnable to neutral position independently of the additional rod.

5. In a transmission gearing, the combination of a set of shift rods operable to effect different gear changes and an additional shift rod operable to effect an additional gear change in connection with any one of the former gear changes, and a selecting and gear shifting lever coacting with said rods, each of the set of rods having notches for receiving the lever, which notches are in transverse alinement when the rods are in neutral, the additional rod having a recess for coacting with the gear shifting lever, said recess being of sufficient length so that one or the other of the opposite end portions is in neutral position when the rod is shifted into one direction or the other, whereby after said additional rod has been shifted in one direction, the gear shifting lever is shiftable to neutral position before said rod can be returned in the opposite direction to its starting position.

6. In a transmission gearing, the combination of a set of shift rods operable to effect different gear changes, and an additional shift rod operable to effect an additional gear change in connection with any one of the former gear changes, a gear shifting lever having a finger for coacting with the shift rods, the set of shift rods having notches for receiving the finger, said notches being arranged in transverse alinement when the shift rods are in neutral position, and the additional rod having an elongated recess substantially equal to the throw of the additional rod plus one half the thickness of the finger, one end portion of the elongated recess being in alinement with the notches in neutral position, and the other end portion of the recess being in alinement with notches in neutral position when the additional rod is shifted.

7. In a transmission gearing, the combination of a main gear set, and an auxiliary gear set, shifter members for shifting the gears of the main gear set, an additional shifter member operable to shift a gear of the auxiliary set, a selecting and gear shifting lever coacting with said shifter members and having a neutral position, the additional shifter member and the shifting lever having coacting means for positively connecting the lever and the additional rod whereby they move as a unit in one direction, and operable to permit return movement of the lever in the opposite direction independently of the rod whereby the gear shifting lever is shiftable back to neutral position independently of the additional shifter member.

8. In a transmission gearing, the combination of a set of shift rods operable to effect different gear changes, and an additional shift rod operable to effect an additional gear change in connection with any one of the former changes, a selecting and gear shifting lever having a finger for cooperating with the shift rods of the set, a shiftable latch member carried by the operating lever, and means on the operating lever for operating it, said member and the additional shift rod having means for coupling the shifting lever and the additional shift rod, and operable to uncouple the shifting lever from the additional shift rod when said rod is in shifted position, and to permit the return of the shifting lever into selective engagement with any of the set of rods.

9. In a transmission gearing, the combination of a set of shift rods operable to effect different gear changes, and an additional shift rod operable to effect an additional gear change in connection with any one of the former changes, a selecting and gear shifting lever having a finger for cooperating with the shift rods of the set, a shiftable latch member carried by the operating lever, and means on the operating lever for operating the latch member, said member and the additional shift rod having means for coupling the shifting lever and the additional shift rod, and operable to uncouple the shifting lever from the additional rod when said rod is in shifted position, and to permit the return of the shifting lever into selective engagement with any of the set of rods, said interlocking means comprising a shoulder on said latch member, and a part provided with a notch on the additional shift rod for receiving the shoulder, the notch being normally arranged in alinement with the shifting lever when the shifting lever is in neutral position.

10. In a transmission gearing, the combination of a set of shift rods operable to effect different gear changes, and an additional shift rod operable to effect an additional gear change in connection with any one of the former changes, a selecting and gear shifting lever having a finger for cooperating with the shift rods of the set, a shiftable latch member carried by the operating lever, and means on the operating lever for operating the latch member, said member and the additional shift rod having means for coupling the shifting lever and the additional shift rod, and operable to uncouple the shifting lever from the additional rod when said rod is in shifted position, and to permit the return of the shifting lever into selective engagement with any of the set of rods, said interlocking means comprising a shoulder on said latch member, and a part provided with a notch on the additional shift rod for receiving the shoulder, the notch being normally arranged in alinement with the shifting lever when the shifting lever is in neutral position, said part in which the notch is provided being formed with a barrier for preventing the engagement of the shoulder in the notch when said member is in normal position.

11. In a transmission gearing, the combination of a set of shift rods operable to effect different gear changes, and an additional shift rod operable to effect an additional gear change in connection with any one of the former changes, a selecting and gear shifting lever having a finger for cooperating with the shift rods of the set, a shiftable latch member carried by the operating lever, and means on the operating lever for operating the latch member, said member and the additional shift rod having means for coupling the shifting lever and the additional shift rod, and operable to uncouple the shifting lever from the additional rod when said rod is in shifted position, and to permit the return of the shifting lever into selective engagement with any of the set of rods, and means on the additional shift rod for preventing interlocking engagement of the shifting lever and the additional rod until said latch member is operated.

In testimony whereof, we have hereunto signed our names, at Syracuse, in the county of Onondaga, and State of New York, this 22nd day of June, 1931.

JOSEPH E. PADGETT.
CARL D. PETERSON.

CERTIFICATE OF CORRECTION.

Patent No. 1,887,943.

November 15, 1932.

JOSEPH E. PADGETT ET AL.

It is hereby certified that error appears in the printed specification of the above numbered patent requiring correction as follows: Page 4, line 26, strike out the number and words "3; gears 54 and 55; countershaft 53; and" and insert the same to follow after the word "shaft" in line 21; and line 41, after "mesh" insert the word "with"; and that the said Letters Patent should be read with these corrections therein that the same may conform to the record of the case in the Patent Office.

Signed and sealed this 27th day of December, A. D. 1932.

(Seal)

M. J. Moore,
Acting Commissioner of Patents.

ber and the additional shift rod having means for coupling the shifting lever and the additional shift rod, and operable to uncouple the shifting lever from the additional rod when said rod is in shifted position, and to permit the return of the shifting lever into selective engagement with any of the set of rods, and means on the additional shift rod for preventing interlocking engagement of the shifting lever and the additional rod until said latch member is operated.

In testimony whereof, we have hereunto signed our names, at Syracuse, in the county of Onondaga, and State of New York, this 22nd day of June, 1931.

JOSEPH E. PADGETT.
CARL D. PETERSON.

CERTIFICATE OF CORRECTION.

Patent No. 1,887,943.                                                November 15, 1932.

JOSEPH E. PADGETT ET AL.

It is hereby certified that error appears in the printed specification of the above numbered patent requiring correction as follows: Page 4, line 26, strike out the number and words "3; gears 54 and 55; countershaft 53; and" and insert the same to follow after the word "shaft" in line 21; and line 41, after "mesh" insert the word "with"; and that the said Letters Patent should be read with these corrections therein that the same may conform to the record of the case in the Patent Office.

Signed and sealed this 27th day of December, A. D. 1932.

(Seal)
M. J. Moore,
Acting Commissioner of Patents.

CERTIFICATE OF CORRECTION.

Patent No. 1,887,943. November 15, 1932.

JOSEPH E. PADGETT ET AL.

It is hereby certified that error appears in the printed specification of the above numbered patent requiring correction as follows: Page 4, line 26, strike out the number and words "3; gears 54 and 55; countershaft 53; and" and insert the same to follow after the word "shaft" in line 21; and line 41, after "mesh" insert the word "with"; and that the said Letters Patent should be read with these corrections therein that the same may conform to the record of the case in the Patent Office.

Signed and sealed this 27th day of December, A. D. 1932.

(Seal)

M. J. Moore,
Acting Commissioner of Patents.